April 4, 1944.  F. M. RANDOLPH  2,345,859
AIR SCRUBBER
Filed Aug. 2, 1940
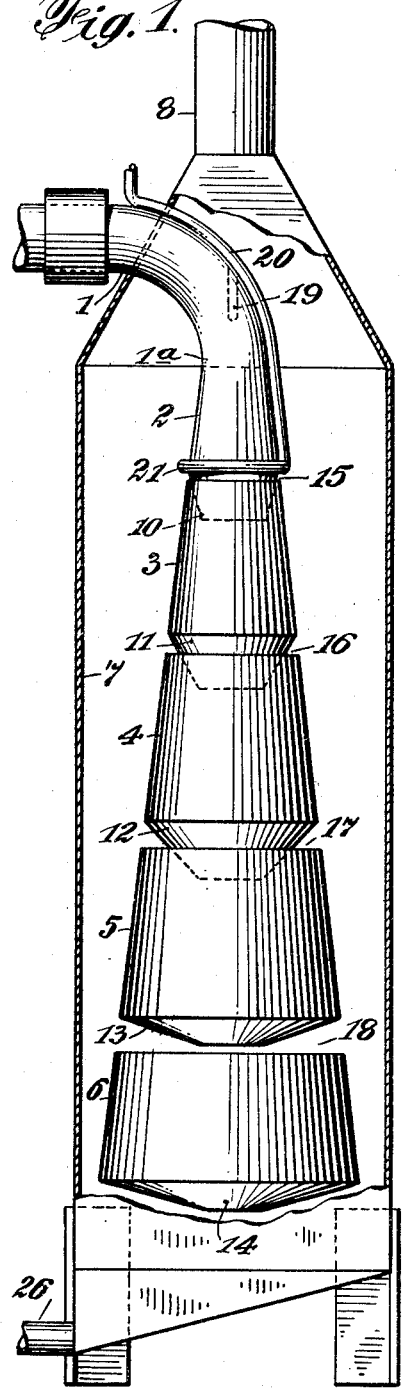
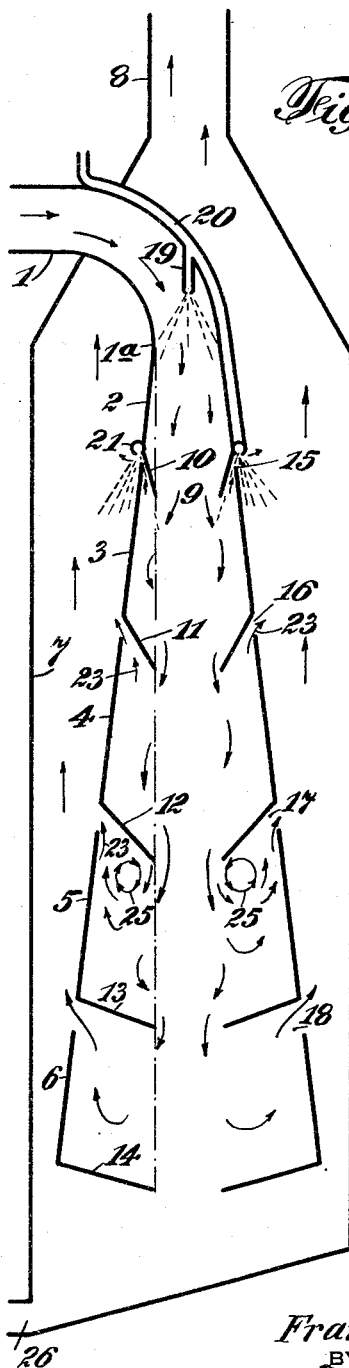
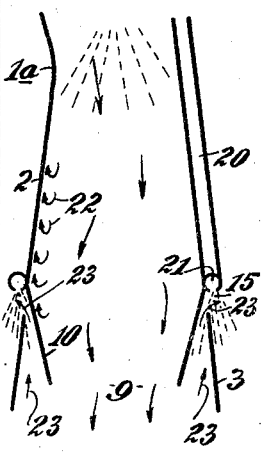
INVENTOR
Frank M. Randolph
BY
E. C. Sanborn
his ATTORNEY Patented Apr. 4, 1944

2,345,859

UNITED STATES PATENT OFFICE 2,345,859

AIR SCRUBBER

Frank M. Randolph, Ajo, Ariz., assignor to Phelps Dodge Corporation, New York, N. Y., a corporation of New York Application August 2, 1940, Serial No. 350,030

10 Claims. (Cl. 183—21)

This invention relates to the separation of particulate matter from gas streams. In the suppression of dust dispersion by induced drafts, as well as in other processes, a variable portion of particulate matter is entrained in the gases; and because this particulate matter may have an intrinsic value and/or to exhaust such a laden gas to the atmosphere may be a nuisance, it is desirable to remove said matter from the gas stream.

Various devices have been employed to accomplish this separation, but none without objection, such as low collecting efficiency, high power consumption, lack of flexibility in operation, obstruction of gas flow by undue accumulation of the separated particles, or high maintenance cost. For example, the common wet washer or scrubber requires high power consumption at reasonably high collecting efficiency, and entails loss of collecting efficiency or increase of power consumption when other than the optimum volume for which it is designed is drawn through the collector. Other collectors involve not only reduced efficiency with reduction in air volume but also plugging of the gas passages by the formation of mud from accumulated dust particles on the dampened collector walls.

An object of my invention is the provision of a novel method and apparatus which overcomes the foregoing disadvantages. The invention provides for the separation of particulate matter from gas streams with marked efficiency, wide flexibility of operation, and pronounced operating economy. Other features and advantages of the invention will be hereinafter more particularly described and claimed.

In the accompanying drawing:

Fig. 1 is a view, partly in vertical section and partly in side elevation, of a form of apparatus for practicing the invention.

Fig. 2 is a diagrammatic view illustrating the operation of the apparatus shown in Fig. 1.

Fig. 3 is a diagrammatic view, on an enlarged scale, illustrating the operation of a portion of said apparatus.

Referring to the drawing, there is shown at 1 a duct or pipe through which the gas and entrained particles are led into the separating apparatus which comprises a series of divergingly tapered chambers 2, 3, 4, 5, and 6. In the present embodiment the diverging chamber 2 is shown integral with the inlet duct 1 and as an extension projecting from the end 1a of said duct. The terminal portion of said duct 1, together with the chambers 2—6, are enclosed in a larger chamber or shell 7, the walls of which may be vertical, as shown, and which may taper at its top to a discharge duct 8. Chambers 3, 4, 5, and 6 may be supported in any suitable manner from the walls of the shell 7.

Each chamber 2—6 terminates at its lower end in an orifice 9, the area of which is the same as or greater than the area of the end 1a of the inlet duct. Each of said orifices is formed by a baffle at the lower end of the respective chamber, the respective baffles being designated 10—14, respectively. It will be noted that the angles of the baffles with respect to the horizontal decrease progressively from baffle 10 to baffle 14, whereby said baffles offer increasing resistance to airflow in the neighborhood of the chamber walls as the air progresses from the inlet duct 1 to the chamber 6.

At the top of each of the chambers 3—6, adjacent the lower wall of the baffle of the preceding chamber, an opening is provided; said openings being designated 15—18, respectively. These openings are provided to enable portions of the air within the respective chambers to pass to exhaust, and also for other purposes hereinafter described.

While it is apparent that the chambers 2—6 and associated baffles might, for example, be of frustro-pyramidal form, they are shown as frustro-conical for purposes of illustration in the present embodiment.

A spray nozzle 19, connected to a water pipe 20, is arranged within the duct 1 to spray water on the walls of the chamber 2 at the terminal end of said inlet duct, thus effectively washing the walls of said chamber and the upper surface of the baffle 10. Also connected to said water pipe 20 is an annular spray 21, located at the level of the top of baffle 10 and above the opening 15; said spray directing water, in the form of a mist or fog, onto the exterior walls of all of the chambers 2—6. At each of the openings 15—18, some of this mist flows into the chambers 3—6, wetting the bottoms of the baffles 10—13, as well as the interior walls of said chambers, and the upper surface of the baffles 11—14.

In operation, the air or other gas carrying particulate matter passes through duct 1, as indicated by the arrows, and expands into the chamber 2 upon emerging from the end 1a of said duct. A portion of the gas impinges upon the wetted upper surface of the baffle 10 and some of the gas turns back upon itself into contact with the inner wetted walls of chamber 2, as indicated by the small arrows 22 (Fig. 3). This turning back of the air is evidently due to the effect of the primary expansion pattern of the air within the chamber 2, the walls of which preferably diverge somewhat more than the angle of divergence of air under free expansion (which angle is known to be about 3° 12'). Particulate matter is thus brought into contact over an extended area with the stream from spray 19 which is flowing along said inner walls of chamber 2 and the upper surface of baffle 10.

From chamber 2, the gas passes through opening 9 in baffle 10, into the chamber 3, wherein said gas again expands as indicated by the arrows in that chamber (Fig. 2). Some of the gas in chamber 3 passes upwardly along the walls of said chamber and through the annular opening 15 into the exhaust chamber 7 (see arrows 23 in Fig. 3). Also, the aspirating or injecting action of the gas passing through the opening 9 creates a low pressure zone adjacent said opening which contributes to the formation of eddies in chamber 3 such as are illustrated for convenience at 25 in chamber 5. As a result it will be apparent not only that the gas must pass through the mist entering into chamber 3 through the opening 15 before the gas can exhaust through said opening, but also that said gas is in position for exhaust only after it has been brought adjacent the wetted walls of said chamber.

From chamber 3 the gas proceeds through the opening in baffle 11 into chamber 4, and from the latter through the opening in baffle 12 into chamber 5. In said chambers 4 and 5 some of the gas passes through the respective openings 16, 17 of said chambers, into the exhaust chamber 7. The gas which passes through the opening in baffle 13 expands into chamber 6, the baffle 14 of which is so arranged as to reverse the direction of flow of said gas so that the latter, as indicated by the arrows, passes upwardly and outwardly through the opening 18 into the exhaust chamber 7.

It may be noted that the exhaust chamber 7 is sufficiently large in relation to the air or gas volume moved through it that a substantially uniform static pressure prevails throughout said chamber. A substantially uniform tendency thus exists for the air to flow from within the chambers 3—6, through the openings 15—18 into the exhaust chamber 7, resulting in a lateral displacement of the expansion pattern of the air within said chambers and hence a lateral displacement of the zone of maximum turbulence toward the walls of said chambers. Furthermore, the progressively increased obtuse angles of the baffles 11—14 result in a progressive increase in the return of air from the bottoms of the chambers 3—6 to the exhaust ports 15—18, resulting in accentuating the turbulence. These factors, in conjunction with the expansion pattern of the air emerging through the openings 9 into said chambers, result in bringing the zone of maximum turbulence of the air adjacent to the walls of said chambers. In chamber 2, the expansion pattern itself causes said zone of maximum turbulence to be brought adjacent the walls of that chamber.

It may also be observed that water in the form of mist or fog passing from the annular spray 21 first wets the outer walls of the chambers 3—6 and enters said chambers along the bottoms of the baffles 10—13. In leaving the bottoms of these baffles it again forms a heavy fog by breaking up of drops which are whipped from the edges of baffles 10—13 by injection into the most turbulent part of the air stream, i. e., the edge of the primary expansion pattern and the eddies such as indicated at 25. This water is worked to the inner walls of the chambers, resulting in a continuous film of water flowing down said inner walls.

In all of the chambers 3—6, eddies such as shown at 25 are formed by the downwardly discharging air streams through the baffle orifices and the rising lateral air streams. More particularly, the induction or drag effect of the stream descending through the orifice 9 into any of said chambers acts upon the rising lateral air stream to form a pronounced eddy or vortex ring. Because of the source of the air in the eddies in said chambers 3—6, said air will be heavily laden with dust, and due to the centrifugal action in such an eddy or vortex ring this dust will obviously be thrown out of the eddies on a tangent. Consideration of these vortex rings will show that as they arise at the top of the chambers in the regions described they are dissipated down stream to the bottom of the chambers and are dispelled on the tops of the baffles 11—14. Such eddies will, therefore, contribute to the separating action of the apparatus in three ways: (a) removal of water from the lower side of the baffles 10—13 and subsequent dispersion of this water, wetting the inside walls of chambers 3—6; (b) centrifugal action, which deposits the particulate matter on the baffles 10—14, as well as a deposition on the walls of the chambers 3—6; (c) by their method of inception these eddies offer a restrictive action on the lateral treated air stream when it discharges through openings 15—18, causing the most completely treated air to exit in a ribbon form, closely related to walls 3—6.

The formation of these eddies, or vortex rings, indicates a recirculation of air in chambers 3—6 as well as in 2, and it is probably this which prevents pronounced reduction in collecting efficiency when the inlet velocity is reduced. The formation of these eddies or vortex rings is furthermore accentuated by the effect of the baffles of progressively increasing obtuseness in causing a progressive increase in the return of air from the bottoms of the chambers towards the openings 15—18.

It will also be apparent that secondary air flow, or recirculation of air, occurs in each of the chambers 2—6, by virtue of the induction of air flow arising from the action of the primary air stream in said chambers, as above described. In chamber 2 (Fig. 3) induction is indicated by arrows 22 as a turning back on itself of the primary air stream, and this turning back necessarily must complete itself with resultant recirculation of air in said chamber 2. And in each of the other chambers recirculation of air, or secondary air flow, occurs as above pointed out.

In addition to its treatment by the water in the zones adjacent the inner walls of the chambers 3, 4, 5, and 6, the gas in said chambers is subjected to the cleansing action of the wetted upper surfaces of the baffles 11—14 and of the streams of water flowing through the interiors of said chambers from the sprays 19 and 21. The gas in chamber 2 is similarly subjected not only to the wetted inner walls of that chamber, and to the wetted upper surface of baffle 10, but also to the main body of the water from spray 19.

It will be apparent from the foregoing description that my invention provides for the passage of substantially all of the gas through the openings 15—18 to the exhaust chamber, and insures the passage of the turbulent gas stream in close proximity to the walls and baffles of the chambers 2—6. Since these walls and baffles are wet a major proportion of the entrained dust, even of the smallest sizes, will be collected on said walls and baffles and removed as sludge. The opening in the baffle 14 is provided for the passage of this sludge to the drain 26 in the exhaust chamber 7.

It may be further noted that the gas flowing upwardly in the exhaust chamber is also subjected to water descending in said chamber from the spray 21, with resultant further cleansing of said gas with respect to such minute proportion of particulate matter as might escape with the gas from the inner chambers 2—6.

In the transporting of dust or other particulate matter in gaseous media, it is generally advisable to develop velocities of said gas of from about 2500 to 6000 feet per minute. At such velocities the gas flow is turbulent rather than laminar. In the embodiment of my invention above described the provision of the diverging chambers 2—6 in the path of a gas stream of high velocity such as above indicated, and the provision of wet walls in said chambers in close proximity to the path of increased turbulence which results from expansion of the gas, accentuates and controls the turbulent motion and causes entrained dust to be impinged by said turbulence upon the chamber walls and baffles whence said dust is removed by the descending water.

It may be further noted that the principal unavoidable energy expenditure in flowing gas streams is encountered in bringing the gas from rest to the velocities required to transport the entrained particulate matter. This energy is lost if the confined gas is abruptly enlarged. However, if the enlargement is effected on a gradual taper, as in the embodiment disclosed, the energy is recoverable in large proportions, the amount of recovery being dependent upon the angular rate of enlargement. I find that the best results are obtained when the divergence of the walls of the chambers 2—6 approaches as a lower limit the divergence that air assumes under free expansion, which is known to be an angle of approximately 3°12'.

It has been found that the arrangement of baffle 14 at an angle of about fifteen degrees to the horizontal causes substantially complete reversal of flow of the descending gas stream.

It will be apparent from the foregoing description that my invention provides not only for pronounced turbulence in the separating chambers but for so controlling that turbulence as to bring the gas-entrained particulate matter into thorough contact with the water flowing adjacent the inner walls of said chambers before the gas can escape to the exhaust chamber, with resultant highly efficient separation of said particulate matter from the gas.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for separating particulate matter from gas streams, said apparatus comprising an inlet duct, a series of diverging chambers disposed in substantially vertical alinement below said duct for receiving gas from said duct, said chambers having openings therebetween, the respective chambers being terminated by baffle means at progressively decreasing angles to the horizontal for providing progressively increasing resistance to the downward passage of said gas to assist in directing gas upwardly to said openings, each of said baffle means having an orifice of an area at least as great as that of said duct.

2. Apparatus for separating particulate matter from gas streams, said apparatus comprising an inlet duct, a series of diverging chambers for receiving gas from said duct, interior spray means for causing a flow of liquid within said chambers, and spray means exterior to said chambers for directing a liquid along the exterior walls thereof, said chambers having passages for the flow of liquid thereinto from said exterior spray means.

3. Apparatus for separating particulate matter from gas streams, said apparatus comprising an inlet duct, a series of diverging chambers for receiving gas from said duct, and spray means exterior to said chambers for directing a liquid along the exterior walls thereof, said chambers having passages for the flow of liquid thereinto from said exterior spray means.

4. Apparatus for separating particulate matter from gas streams, said apparatus comprising an inlet duct, a series of diverging chambers disposed in substantially vertical alinement below said duct for receiving gas from said duct, said chambers having openings therebetween, each of said chambers being terminated by baffle means, the baffle means of the respective chambers being arranged to provide progressively increasing resistance to the downward flow of said gas to assist in directing gas upwardly to said openings, and the baffle means for the final chamber of the series being arranged to reverse the downward flow of substantially all of the gas entering said chamber.

5. Apparatus for separating particulate matter from gas streams, said apparatus comprising an inlet duct, a series of diverging chambers for receiving gas from said duct, the respective chambers being terminated by baffle means at progressively decreasing angles to the horizontal for providing progressively increasing resistance to the passage of said gas, each of said baffle means having an orifice of an area at least as great as that of said duct and spray means exterior to said chambers for directing liquid on to the outer walls thereof, said chambers having passages for the flow of liquid thereinto from said exterior spray means.

6. Apparatus for separating particulate matter from gas streams, said apparatus comprising an inlet duct, a series of downwardly diverging walls defining chambers disposed in downward succession below said duct for receiving gas therefrom, other wall means defining an exhaust chamber disposed laterally of and surrounding said downward succession of diverging chambers, said diverging chambers having openings for the passage of gas laterally into said exhaust chamber, means for directing liquid into said diverging chambers, each of said diverging chambers having baffle means adjacent the lower end thereof in the path of gas flowing downwardly in said chamber to direct a portion of said gas upwardly in said chamber.

7. Apparatus as defined by claim 6, wherein said exhaust chamber is so constructed and arranged as to provide a substantially uniform static pressure throughout the zone surrounding said diverging chambers.

8. Apparatus for separating particulate matter from gas streams, said apparatus comprising an inlet duct, a series of downwardly diverging walls defining chambers disposed in downward succession below said duct, said duct communicating with the uppermost one of said chambers for delivering the contents of said duct into the interior of said uppermost chamber, means for wetting the interior walls of said chambers, the chambers beneath said uppermost chamber having openings for the passage of gas laterally therefrom into surrounding space, each of said chambers being terminated by baffle means, the baffle means of the chambers below the uppermost chamber being arranged to assist in directing gas upwardly toward said openings, and the baffle means of each chamber above the lowermost chamber of the series having an orifice of less cross-sectional area than that of the next lower chamber to enable gas to pass downwardly and expand into said next lower chamber.

9. Apparatus for separating particulate matter from gas streams, said apparatus comprising an inlet duct, a series of downwardly diverging walls defining chambers disposed in downward succession below said duct, said duct communicating with the uppermost one of said chambers for delivering the contents of said duct into the interior of said uppermost chamber, means for wetting the interior walls of said chambers, the walls of said uppermost chamber being so related to the angle of divergence of the gas under free expansion as to enable gas emerging from said duct to turn back upon itself into contact with the wetted inner surface of said walls, the chambers beneath said uppermost chamber having openings for the passage of gas laterally therefrom into surrounding space, each of said chambers being terminated by baffle means, the baffle means of the chambers below the uppermost chamber being arranged to assist in directing gas upwardly toward said openings, and the baffle means of each chamber above the lowermost chamber of the series having an orifice of less cross-sectional area than that of the next lower chamber to enable gas to pass downwardly and expand into said next lower chamber.

10. Apparatus for separating particulate matter from gas streams, said apparatus comprising an inlet duct, a series of downwardly diverging walls defining chambers disposed in downward succession below said duct, said duct communicating with the uppermost one of said chambers for delivering the contents of said duct into the interior of said uppermost chamber, means for wetting the interior walls for said chambers, the chambers beneath said uppermost chamber having openings for the passage of gas laterally therefrom into surrounding space, and means comprising baffles having orifices therein between successive chambers for assisting in directing gas toward said openings and toward the interior wetted walls of said chambers.

FRANK M. RANDOLPH.